US011332151B2

(12) United States Patent
Sasaki et al.

(10) Patent No.: US 11,332,151 B2
(45) Date of Patent: May 17, 2022

(54) SLIP ANGLE ESTIMATION DEVICE FOR A VEHICLE

(71) Applicant: Toyota Jidosha Kabushiki Kaisha, Toyota (JP)

(72) Inventors: Hiroaki Sasaki, Hadano (JP); Hisanori Mitsumoto, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 16/720,756

(22) Filed: Dec. 19, 2019

(65) Prior Publication Data
US 2020/0198646 A1 Jun. 25, 2020

(30) Foreign Application Priority Data
Dec. 25, 2018 (JP) .............................. JP2018-241102

(51) Int. Cl.
*B60W 40/103* (2012.01)
*B60W 10/188* (2012.01)

(52) U.S. Cl.
CPC ........ *B60W 40/103* (2013.01); *B60W 10/188* (2013.01); *B60W 2420/42* (2013.01); *B60W 2520/125* (2013.01); *B60W 2520/14* (2013.01)

(58) Field of Classification Search
CPC ............. B60W 40/103; B60W 10/188; B60W 2420/42; B60W 2520/14; B60W 2520/125; B60T 2230/02; B60T 8/17552; B60T 8/17551
USPC .......................................................... 701/70
See application file for complete search history.

(56) References Cited

U.S. PATENT DOCUMENTS

| | | | |
|---|---|---|---|
| 2002/0087269 A1 | 7/2002 | Sasaki et al. | |
| 2005/0203706 A1 | 9/2005 | Ihara et al. | |
| 2014/0043473 A1* | 2/2014 | Gupta | G06T 7/80 348/135 |
| 2014/0257640 A1* | 9/2014 | Mitsumoto | B60W 40/101 701/41 |
| 2015/0049193 A1* | 2/2015 | Gupta | G03B 43/00 348/148 |
| 2015/0166062 A1* | 6/2015 | Johnson | B60W 10/20 701/41 |

(Continued)

FOREIGN PATENT DOCUMENTS

| | | |
|---|---|---|
| JP | 2000-081322 A | 3/2000 |
| JP | 2000-127849 A | 5/2000 |

(Continued)

*Primary Examiner* — Jonathan M Dager
*Assistant Examiner* — Jean W Charleston
(74) *Attorney, Agent, or Firm* — Dinsmore & Shohl LLP

(57) ABSTRACT

A slip angle estimation device for a vehicle comprises an imaging device for capturing an image of at least one of the front and the rear of the vehicle and a control unit. The imaging device is a CCD camera including a lens and an imaging sensor. The control unit is configured to determine a plurality of tracking points for a plurality of captured objects, determine an optical flow for the plurality of tracking points based on two images captured at predetermined elapsed time intervals, determine a vanishing point based on intersections of the plurality of optical flows, and calculate a slip angle of the vehicle based on a ratio of a horizontal distance between an image center and the vanishing point to a distance between a lens center of the CCD camera and an imaging sensor.

8 Claims, 7 Drawing Sheets

(56) References Cited

U.S. PATENT DOCUMENTS

| | | | | |
|---|---|---|---|---|
| 2015/0291214 A1* | 10/2015 | Mitsumoto | .......... | B62D 5/0457 |
| | | | | 701/41 |
| 2017/0008557 A1* | 1/2017 | Mitsumoto | ............ | B62D 3/126 |
| 2018/0134267 A1* | 5/2018 | Mitsumoto | ......... | B60T 8/17552 |
| 2019/0163988 A1* | 5/2019 | Watanabe | ................ | B60R 1/002 |
| 2019/0299980 A1* | 10/2019 | Harai | ................. | B60G 17/0195 |

FOREIGN PATENT DOCUMENTS

| JP | 2005-258936 A | 9/2005 |
|---|---|---|
| JP | 2006-282168 A | 10/2006 |
| JP | 2008-225784 A | 9/2008 |
| JP | 2013-015489 A | 1/2013 |
| JP | 2013-241063 A | 12/2013 |
| JP | 2014-069679 A | 4/2014 |

* cited by examiner

SLIP ANGLE ESTIMATION DEVICE FOR A VEHICLE

CROSS-REFERENCE TO RELATED APPLICATION

This application claims priority to Japanese Patent Application No. JP2018-241102 filed on Dec. 25, 2018, the content of which is hereby incorporated by reference in its entirety into this application.

BACKGROUND

1. Technical Field

The present disclosure relates to a slip angle estimation device for a vehicle such as an automobile.

2. Description of the Related Art

In behavior control of a vehicle such as an automobile, especially in spin control, a slip angle of a vehicle is calculated, and braking forces of wheels are controlled based on the slip angle so that an anti-spin yaw moment is applied to the vehicle and the vehicle is decelerated. A slip angle of the vehicle is calculated based on motion state quantities such as a lateral acceleration of the vehicle.

For example, it is well known to calculate a side slip velocity Vy of a vehicle by integrating a deviation Gy−V·Yr between a lateral acceleration Gy of the vehicle and a product of a vehicle speed V and a yaw rate Yr and to calculate a slip angle β of the vehicle as a ratio of the side slip velocity Vy of the vehicle to a longitudinal velocity Vx (=vehicle speed V) of the vehicle. Further, as described in Japanese Patent Application Laid-open No. 2013-241063, it is also already known to calculate a slip angle β of a vehicle based on a yaw rate Yr of the vehicle detected by a yaw rate sensor and a lateral acceleration Gy of the vehicle detected by a lateral acceleration sensor.

When a vehicle travels on a road on which a road surface is inclined in a lateral direction (hereinafter referred to as "lateral inclination road"), such as a cant road and a bank road, a lateral force is exerted on the vehicle due to a lateral inclination of the road surface. A lateral acceleration sensor detects a lateral acceleration by utilizing action of a lateral force corresponding to a lateral acceleration on an inertia weight. Consequently, when a vehicle travels on a lateral inclination road, a lateral force caused by a lateral inclination of the road surface acts on the inertia weight, so that a lateral acceleration of the vehicle cannot be accurately detected. Therefore, when a slip angle of the vehicle is calculated based on a detected lateral acceleration of the vehicle, a slip angle cannot be accurately calculated in a situation where the vehicle travels on a lateral inclination road.

SUMMARY

The present disclosure provides an improved slip angle estimation device that can accurately estimate a slip angle of a vehicle even when the vehicle travels on a lateral inclination road.

The present disclosure provides a slip angle estimation device for a vehicle comprising an imaging device for capturing an image of at least one of the front and the rear of the vehicle and a control unit configured to calculate a slip angle of the vehicle based on information of images captured by the imaging device.

The control unit is configured to determine a plurality of tracking points for a plurality of captured objects, determine optical flows for the plurality of tracking points based on two images captured at predetermined elapsed time intervals, determine a vanishing point based on intersections of the plurality of optical flows, and, calculate a slip angle of the vehicle based on a horizontal distance between a center of the images and the vanishing point.

According to the present disclosure, a plurality of tracking points for a plurality of captured objects are determined, optical flows for the plurality of tracking points are determined based on two images captured at predetermined elapsed time intervals, a vanishing point is determined based on intersections of the plurality of optical flows, and a slip angle of the vehicle is calculated based on a horizontal distance between a center of the images and the vanishing point.

As will be described in detail later, a center of the images corresponds to a longitudinal direction of the vehicle, and the vanishing point corresponds to a moving direction of the vehicle or the opposite direction thereof. Thus, a horizontal distance between the center of the images and the vanishing point corresponds to a relations hip between a moving direction of the vehicle or the reverse direction with respect to the longitudinal direction of the vehicle, that is, a slip angle of the vehicle.

Further, horizontal positions of the plurality of tracking points in the images and a horizontal distance between the center of the images and the vanishing point are not affected by a side force caused by a lateral inclination of a road even when the vehicle travels on a lateral inclination road. Therefore, according to the above configuration, even when the vehicle travels on a lateral inclination road, a slip angle of the vehicle can be accurately estimated without being affected by a lateral force caused by a lateral inclination of a road surface.

In one aspect of the present disclosure, the control unit is configured to store a first reference frame centered on the center of the images and a second reference frame surrounding the first reference frame, and deter plurality of characteristic points of the objects located in a tracking point determination area between the first and second reference frames as tracking points.

According, to the above aspect, a first reference frame centered on the center of the images and a second reference frame surrounding the first reference frame are stored, and a plurality of characteristic points of the objects located in a tracking point determination area between the first and second reference frames are determined as tracking points. Therefore, tracking points can be determined efficiently and load on the control unit can be reduced as compared to where a plurality of characteristic points of objects in the whole range of the images are searched without setting a tracking point determination area and they are determined as tracking points. Further, it is possible to effectively reduce the possibility that any characteristic point moving to a position where an optical flow cannot be properly determined after a predetermined elapsed time is determined as a tracking point.

In another aspect of the present disclosure, the imaging device includes a lens and an imaging sensor, and the control unit is configured to calculate a slip angle of the vehicle based on a ratio of the horizontal distance at the imaging sensor to a distance between the lens and the imaging sensor.

As will be described in detail later, a slip angle of a vehicle is an inclination angle formed by a straight line connecting a center of the lens and the vanishing point with respect to an optical axis when viewed from above the vehicle, and the inclination angle can be calculated based on a ratio of the above horizontal distance in the imaging sensor to a distance between the center of the lens and the imaging sensor. According to the above aspect, a slip angle of the vehicle is calculated based on a ratio of the horizontal distance in the imaging sensor to a distance between the center of the lens and the imaging sensor, so that a slip angle of the vehicle can accurately be calculated.

In another aspect of the present disclosure, the control unit is configured to determine a plurality of intersections and determine a vanishing point based on intersections having the highest matching rate among the plurality of intersections.

Ideally, a plurality of optical flows intersect at one point, so that intersections of the plurality of optical flows form one point. However, there may be cases where intersections of the plurality of optical flows do not form one point due to determination errors of the plurality of tracking points and the optical flows. According to the above aspect, a plurality of intersections are determined, and a vanishing point is determined based on intersections having the highest matching rate among the plurality of intersections. Therefore, even when intersections of a plurality of optical flows do not form one point, a vanishing point can be determined with certainty, and a position of the vanishing point can be determined at an appropriate position.

Further, in another aspect of the present disclosure, the control unit includes a slip angle calculation device configured to calculate a slip angle of the vehicle based on motion state quantities of the vehicle, and is configured not to calculate a slip angle of the vehicle based on the horizontal distance when a number of determined tracking points is less than a reference number and to calculate a slip angle of the vehicle by the slip angle calculation device.

When objects in front of the vehicle cannot be clearly imaged because of weather conditions, night travel, or other conditions, the number of tracking points to be determined decreases. Thus, the number of optical flows determined based on the small number of tracking points and the number of intersections of the optical flows are also reduced. Therefore, when a slip angle of the vehicle is calculated based on the horizontal distance, a vanishing point may be determined to an incorrect position instead.

According to the above aspect, when a number of determined tracking points is less than a reference number, a slip angle of the vehicle is not calculated based on the horizontal distance but is calculated by the slip angle calculation device. Therefore, it can be avoided that a vanishing point is determined to an incorrect position by calculating a slip angle of the vehicle based on the horizontal distance due to the small number of tracking points, optical flows and intersections of the optical flows.

Further, in another aspect of the present disclosure, the control unit includes a slip angle calculation device configured to calculate a slip angle of the vehicle based on motion state quantities of the vehicle, and is configured not to calculate a slip angle of the vehicle based on the horizontal distance when the highest match rate is less than a reference match rate and to calculate a slip angle of the vehicle by the slip angle calculation device.

When intersections of a plurality of optical flows do not form one point due to determination errors of a plurality of tracking points and optical flows, an intersection with the highest matching rate among the plurality of intersections is determined as a vanishing point according to the above configuration. However, even if an intersection with the highest match rate is determined as a vanishing point, when the match rate is a low value, a horizontal distance may be inaccurately calculated, so that a slip angle of the vehicle may the inaccurately calculated based on the horizontal distance.

According to the above aspect, when the highest match rate is less than a reference match rate, a slip angle of the vehicle is not calculated based on the horizontal distance but is calculated by the slip angle calculation device. Therefore, it is possible to avoid that a slip angle of the vehicle is inaccurately calculated based on the horizontal distance despite the highest match rate is a low value.

Further, in another aspect of the present disclosure, the control unit is configured to variably set a predetermined elapsed time according to a vehicle speed so that the predetermined elapsed time becomes shorter as the vehicle speed increases.

If a predetermined elapsed time is set to a short constant time, when the vehicle travels at a low speed, movement distance of each tracking point in the images becomes too short even when the predetermined elapsed time passes. As a result, it becomes impossible to determine optical flows and a vanishing point which is their intersections to be at a correct position. Conversely, if a predetermined elapsed time is set to a long constant time, when the vehicle travels at a high speed, movement distance of each tracking point in the images when the predetermined elapsed time passes may become too long. As a result, the number of optical flows and intersections thereof are reduced due to movement of some of tracking points out of the image, etc., so that it becomes impossible to determine a vanishing point to be at a correct position.

According to the above aspect, a predetermined elapsed time is variably set according to a vehicle speed so that the predetermined elapsed time becomes shorter as the vehicle speed increases. Therefore, it is possible to reduce the possibility of the above-mentioned problems occurring when a predetermined elapsed time is set to a short constant time or a long constant time, and to determine a vanishing point at an accurate position.

Further, according to the present disclosure, a spin control device for a vehicle comprising the slip angle estimation device for a vehicle is provided. In a situation where a slip angle of the vehicle is calculated by the slip angle calculation device, control of braking forces by spin control is permitted when a permission condition based on a deviation between a yaw rate of the vehicle and a reference yaw rate is satisfied, and in a situation where a slip angle of the vehicle is calculated based on the horizontal distance, control of braking forces by spin control is permitted when a permission condition based on a deviation between a yaw rate of the vehicle and a reference yaw rate or a permission condition based, on a deviation between a slip angle of the vehicle calculated based on the horizontal distance and a reference slip angle is satisfied.

In spin control of a vehicle such as an automobile, permission determination of braking force control by spin control may be performed by determining whether a magnitude of a yaw rate deviation that is a deviation between an actual yaw rate of the vehicle and a reference yaw rate is larger than a reference value. According to this permission determination, it is possible to reduce the possibility that the braking force control by the spin control is unnecessarily executed as compared to where the permission determination is not performed.

However, in a situation of so-called slow spin where an increase speed of a magnitude of a slip angle of a vehicle is slow, a magnitude of a yaw rate deviation may hardly exceed the reference value. Consequently, even if a vehicle is in a spin state, the braking force control by the spin control is not permitted, and the behavior of the vehicle cannot be stabilized.

In order to avoid the occurrence of the above situation, it is conceivable to determine that the braking force control by the spin control is permitted when a magnitude of a yaw rate deviation is greater than or equal to a reference value, or when, a magnitude of a slip angle deviation, which is a deviation between a vehicle slip angle and a reference slip angle, is equal to or more than a reference value. However, as described above, when a slip angle of the vehicle is calculated based on a lateral acceleration of the vehicle, a slip angle cannot be accurately calculated in a situation where the vehicle travels on a lateral inclination road. Therefore, in the situation where a vehicle travels on a lateral inclination road, it is not possible to appropriately determine whether or not the braking force control by the spin control is permitted by the permission determination based on a slip angle deviation.

According to the above aspect, in a situation where a slip angle of the vehicle is calculated based on the horizontal distance, control of braking forces by spin control is permitted when a permission condition based on a deviation between a yaw rate of the vehicle and a reference yaw rate or a permission condition based on a deviation between a slip angle of the vehicle calculated based on the horizontal distance and a reference slip angle is satisfied. Thus, even if the permission condition based on a yaw rate deviation is not satisfied, if the permission condition based on a slip angle deviation is satisfied, the control of the braking force by the spin control is permitted. Therefore, it is possible to appropriately determine whether or not the braking force control by the spin control is permitted by the permission determination based on a slip angle deviation without being affected by a lateral force caused by a lateral inclination of a road surface even when the vehicle travels on a lateral inclination road.

Other objects, other features and attendant advantages of the present disclosure will be readily understood from the description of the embodiments of the present disclosure described with reference to the following drawings.

DETAILED DESCRIPTION

The present disclosure will now be described in detail with reference to the accompanying drawings.

First Embodiment

Figure 1:
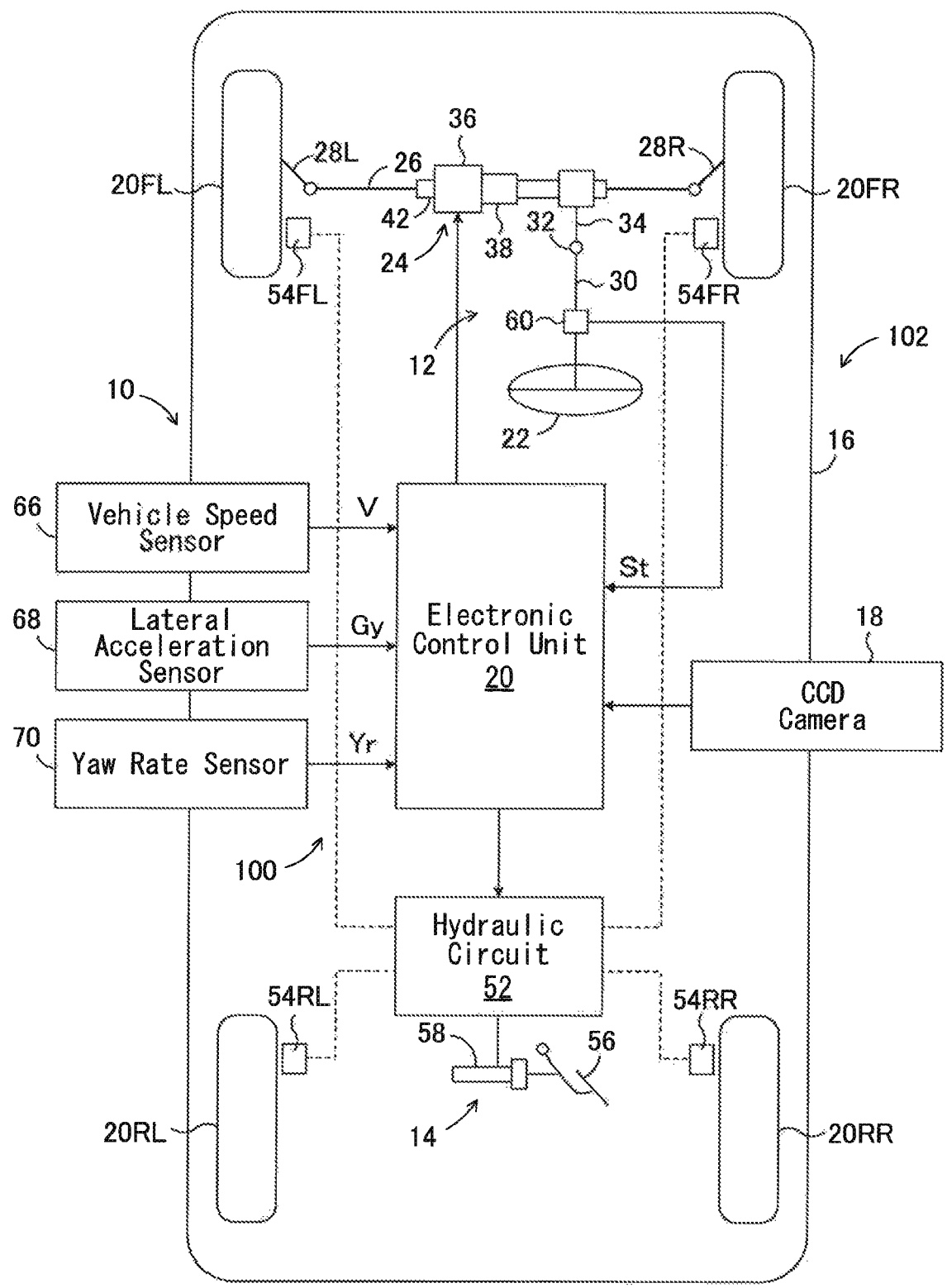
FIG. 1 is a schematic configuration view showing a first embodiment of a vehicle slip angle estimation device according to the present disclosure.

In FIG. 1, a slip angle estimation device 10 for a vehicle according to the first embodiment of the present disclosure is applied to a vehicle 16 having a steering device 12 and a braking device 14 and includes a charge-coupled device (CCD) camera 18 serving as an imaging device and an electronic control unit 20. The CCD camera 18 is disposed, for example, in a front portion of a vehicle compartment of the vehicle 16 and acquires image information in front of the vehicle by capturing an image of the front of the vehicle 16. A travel control part of the control unit 20 is configured to calculate a slip angle β of the vehicle 16 based on an information of images captured by the COD camera 18 as will be described in detail later. Further, the traveling control part of the control unit 20 determines whether or not the vehicle 16 is in a spin state based on at least the slip angle β.

The vehicle 16 has left and right front wheels 20FL and 20FR serving as steered wheels and left and right rear wheels 20RL and 20RR serving as non-steered wheels. The steering device 12 is configured to change a steered angle of the front wheels 20FL and 20FR in response to a driver's steering operation. Although not shown in FIG. 1, the front wheels 20FL and 20FR are supplied with driving force from an engine via a transmission. The vehicle to which the present disclosure is applied may be any one of a front wheel drive vehicle, a rear wheel drive vehicle and a four wheel drive vehicle.

The steering device 12 includes a rack-and-pinion type electric power steering device 24 which is driven in response to operation of a steering wheel 22 by the driver. A rack bar 26 of the electric power steering device 24 is connected to knuckle arms (not shown) of the front wheels 20FL and 20FR via tie rods 28L and 28R, respectively. The steering wheel 22 is connected to a pinion shaft 34 of the power steering device 24 via a steering shaft 30 and a universal joint 32.

In the illustrated embodiment, the electric power steering device 24 is a rack coaxial type electric power steering device, and includes a motor 36 and a conversion mechanism 38, e.g., a ball screw mechanism, configured to convert a rotational torque of the motor 3$ into a force in a reciprocal direction of the rack bar 26. The electric power steering device 24 is controlled by an electric power steering device (EPS) control part of the electronic control unit 20. The electric power steering device 24 functions as a steering assist force generating device that reduces a steering burden of the driver by generating auxiliary steering force that drives the rack bar 26 relative to the housing 42.

The braking device 14 controls braking forces of the wheels by controlling pressures in wheel cylinders 54FL, 54FR, 54RL and 54RR, that is, braking pressures, by a hydraulic circuit 52. Although not shown in FIG. 1, the hydraulic circuit 52 includes an oil reservoir, an oil pump, various valve devices, etc., and braking pressures of the wheel cylinders are normally controlled by a master cylinder 58 driven in response to depression of a brake pedal 56 by a driver. Further, braking pressures of the wheel cylinders are individually controlled by the hydraulic circuit 52 being controlled as necessary by a braking force control part of the electronic control unit 20.

Thus, the braking device 14 can individually control braking forces of the wheels even if the driver does not perform a braking operation, and can apply a spin prevention yaw moment to the vehicle 16 by a braking force difference between the left and right wheels. Therefore, when the traveling control part of the electronic control unit 20 determines that the vehicle 16 is in a spin state, the braking force control part controls the braking device 14 to apply a spin prevention yaw moment to the vehicle 16 and decelerate the vehicle so as to stabilize a behavior of the vehicle.

As shown in FIG. 1, in the illustrated embodiment, the steering shaft 30 is provided with a steering angle sensor 60. The steering angle sensor 60 detects a steering angle St, that is, a rotation angle of the steering shaft 30 as a steering operation amount by the driver. A signal indicating a steering angle St is input to the traveling control part and the EPS control part of the electronic control unit 20.

A signal indicating a vehicle speed V detected by a vehicle speed sensor 66, a signal indicating a lateral acceleration Gy of the vehicle detected by a lateral acceleration sensor 68, and a signal indicating a yaw rate Yr of the vehicle detected by a yaw rate sensor 70 are also input to the traveling control part of the electronic control unit 20. A steering angle θ assumes a positive value when steering in the left turning direction is performed, and vehicle state quantities such as a lateral acceleration Gy and a yaw rate Yr and standard state quantities thereof assume positive values when the vehicle turns left.

Figure 2:
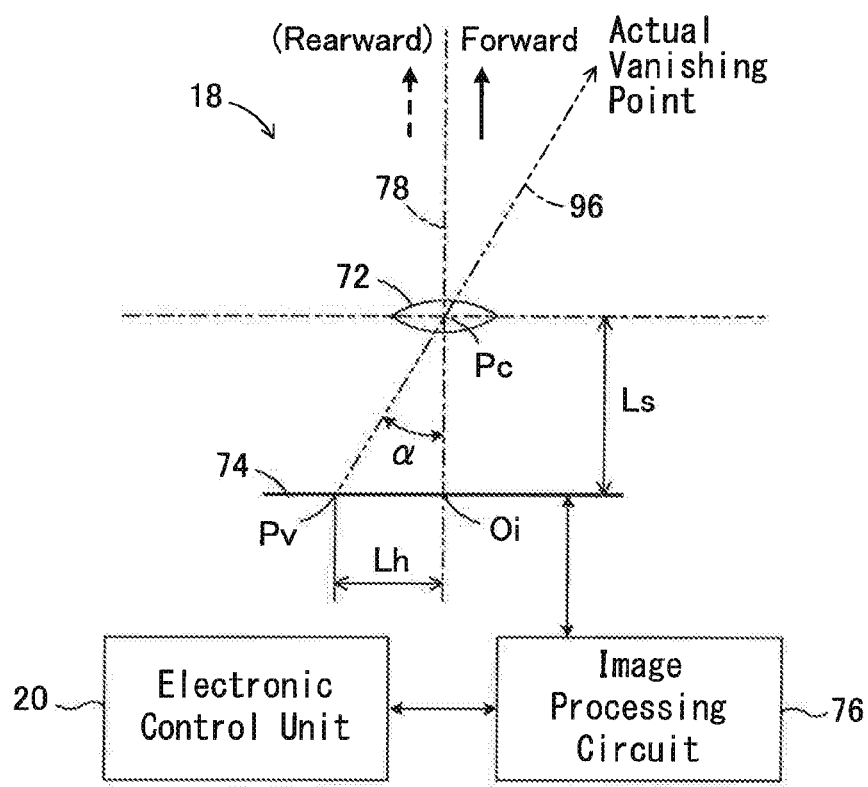
FIG. 2 is a schematic configuration view showing a COD camera in the first embodiment as viewed from above a vehicle.

Further, a signal indicating information on an image in front of the vehicle 16 captured by the CCD camera 18 is input to the traveling control part of the electronic control unit 20. As schematically shown in FIG. 2, the CCD camera 18 includes a lens 72, an imaging sensor 74 and an image processing circuit 76, and captures the front of the vehicle 16 along an optical axis 78 for each predetermined imaging time Δt1 (a positive constant) to acquire still image information. The optical axis 78 is aligned with a longitudinal direction of the vehicle 16 as viewed from above the vehicle. As is well known, an optical image information having passed through the lens 72 is converted into electrical image information by the imaging sensor 74, and the electrical image information is processed by the image processing circuit 76 and output from the image processing circuit 76 to the travel control part of the electronic control unit 20.

Each control part of the electronic control unit 20 may include a microcomputer having a CPU, a ROM, a RAM, and an input/output port device connected to one another by a bidirectional common bus. Each control part transmits and receives mutually necessary signals. Each ROM stores a program for control performed by each electronic control part, and each control is executed by the CPU in accordance with the corresponding control program. In particular, a control program for calculating a slip angle β of the vehicle 16 based on an image information in front of the vehicle acquired by the CCD camera 18 is stored in the ROM of the traveling control part of the electronic control unit 20. This control program corresponds to the flowchart shown in FIG. 6 described later.

Figure 3:
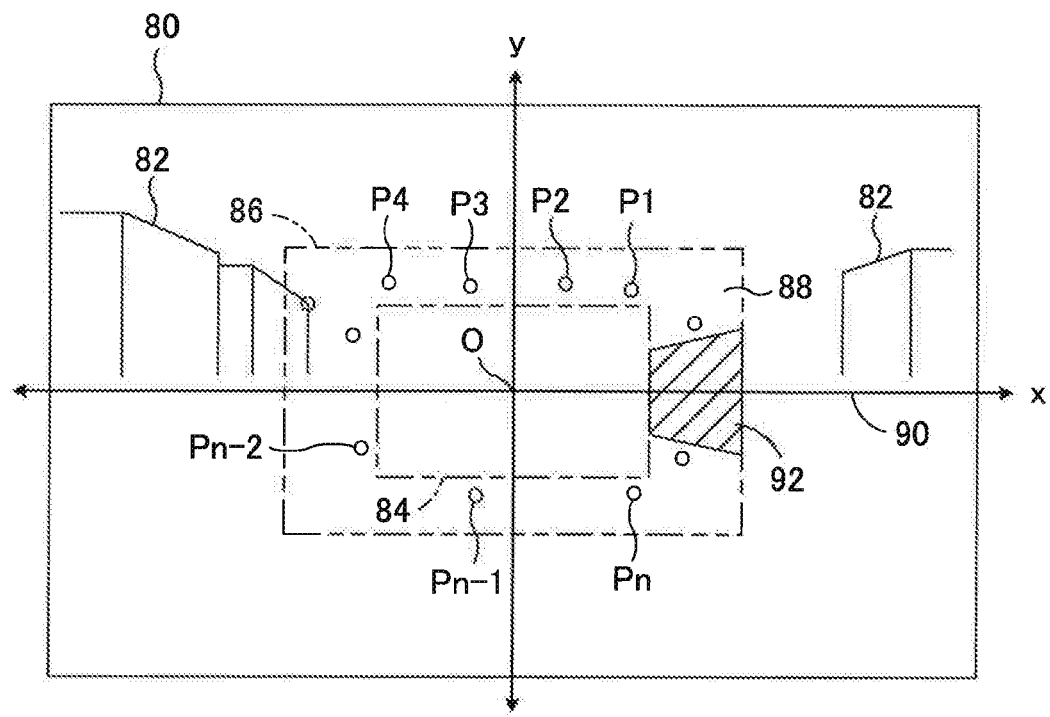
FIG. 3 is a diagram showing a procedure of determining tracking points P1 to Pn for a plurality of objects in a captured image and calculating their coordinates in the first embodiment.

As shown in FIG. 3, the ROM of the traveling control part stores rectangular first and second reference frames 84 and 86 for determining a plurality of tracking points for a plurality of objects 82 in a captured image 80. The first and second reference frames 84 and 86 are centered on a center O of the image 80 and similar to an outer shape of the image 80, and the second reference frame 86 surrounds the first reference frame 84. The center O corresponds to an intersection Oi (see FIG. 2) of the optical axis 78 and the imaging sensor 74.

The CPU of the traveling control part searches for n characteristic points of the plurality of objects 82 in the tracking point determination area 88 between the first reference frame 84 and the second reference frame 86, and determines them as tracking points P1 to Pn (n is a positive integer less than or equal to nmax which is a positive constant integer). In FIG. 3, examples of the determined tracking points are shown by white small circles. Further, the CPU calculates the coordinates of each tracking point at the x-y orthogonal coordinates 90 having the center O as the origin, and stores the information of those coordinates in the RAM. Notably, when any object in front of the vehicle cannot be clearly imaged due to weather conditions, night travel, or other conditions, the number n of tracking points actually determined may be less than nmax.

For example, a predetermined number of characteristic points may be searched for objects 82 in the tracking point determination area 88 in the order of the first quadrant, the second quadrant, the third quadrant, and the fourth quadrant of the x-y orthogonal coordinates 90, the searched characteristic points may be determined as tracking points, and coordinates of those tracking points may be calculated. Although not shown in the figure, the search may be performed in a counterclockwise direction or clockwise direction for each area from divided areas closer to the first reference frame 84 to divided areas closer to the second reference frame 86 in each quadrant. This may be done by scanning the image 80 and determining characteristic points such as building corners.

In countries and areas where vehicles are passing on the left, there is a high possibility that vehicles traveling in the opposite lane toward the vehicle will be photographed in the lower area of the first quadrant and the upper area of the fourth quadrant. The image information of these vehicle is extra information for determining a vanishing point. Therefore, for example, as indicated by hatching in FIG. 3, a tracking point determination exclusion area 92 in which, any tracking point is not determined may be set. In addition, in countries and areas where vehicles are passing on the right, the tracking point determination exclusion area 92 may be set to the lower area of the second quadrant and the upper area of the third quadrant.

Figure 4:
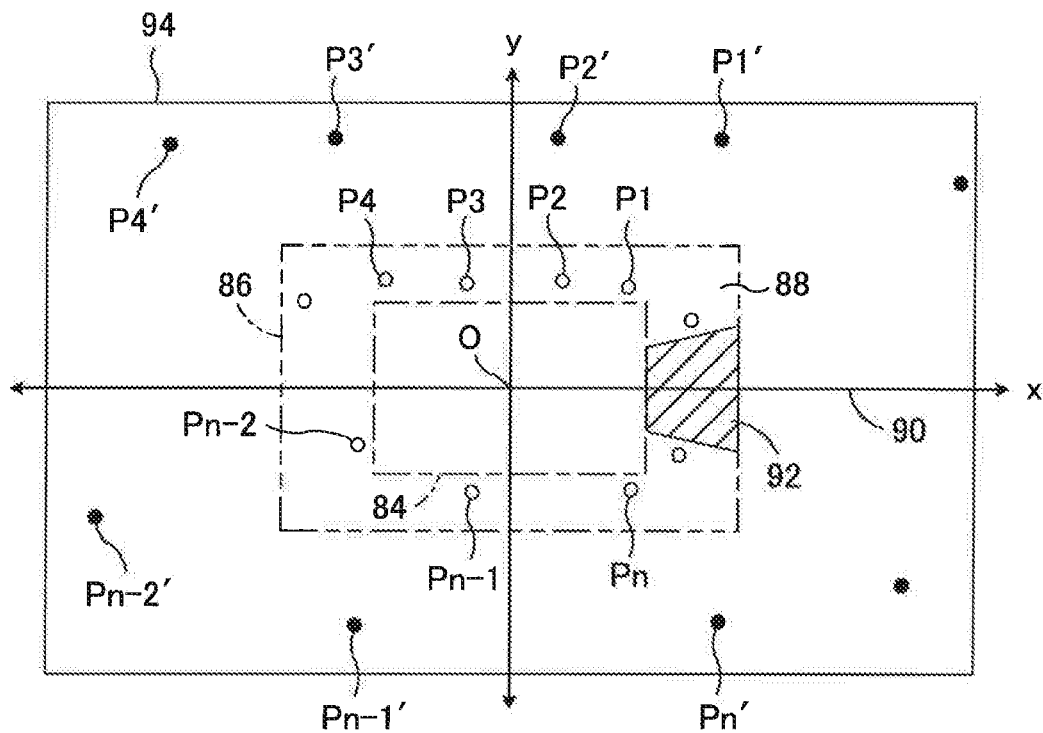
FIG. 4 is a diagram showing a procedure of specifying tracking points P1' to Pn' after movement and calculating their coordinates in an image captured after a predetermined elapsed time in the first embodiment.

Next, as shown in FIG. 4, the CPU specifies tracking points P1' to Pn' after moving corresponding to the tracking points P1 to Pn, respectively, with respect to an image 94 captured after a predetermined elapsed time Δt2 from the capturing of the image 80, calculates their coordinates, and stores the same coordinate information in the RAM. In FIG. 4, the specified tracking points after moving are indicated by black small circles.

If any tracking point after moving is out of the image 94 and any tracking point after moving cannot be identified, no optical flow is determined for those tracking points. The predetermined elapsed time Δt2 may be a positive constant equal to or greater than the predetermined imaging time Δt1 but is variably set according to a vehicle speed V so as to decrease as the vehicle speed V increases.

Figure 5:
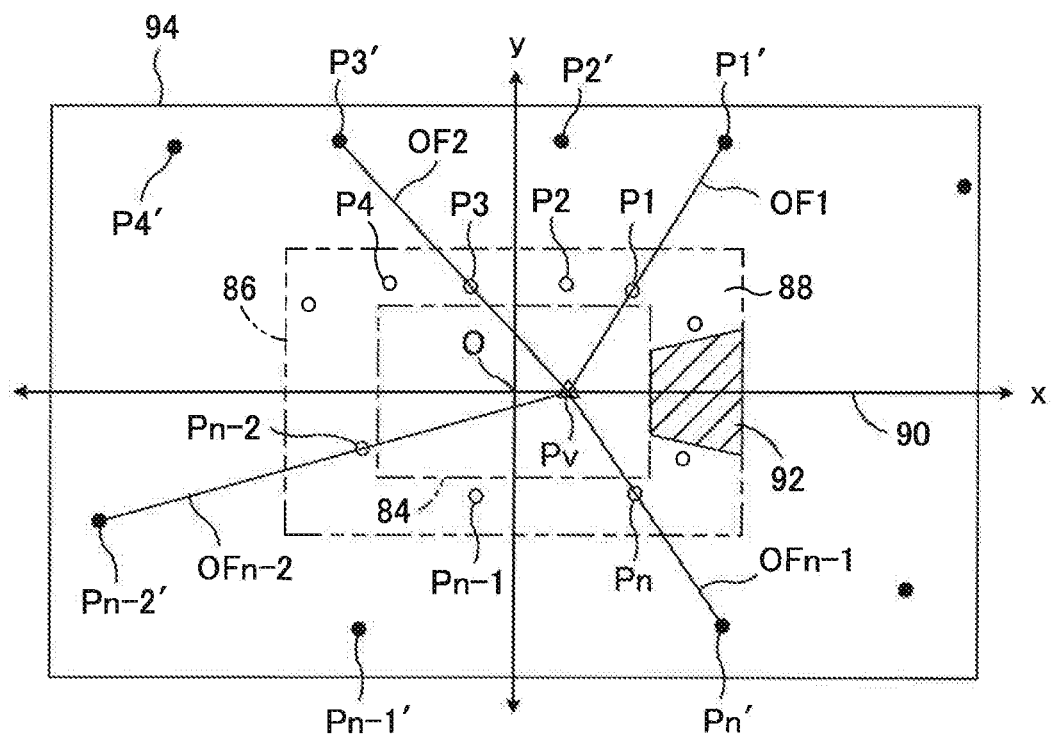
FIG. 5 is a diagram showing a procedure for determining optical flows OF1 to OFn and determining their intersections in the first embodiment.

Next, the CPU determines optical flows OF1 to OFn as straight lines connecting corresponding tracking points based on the coordinates of the tracking points P1 to Pn and the coordinates of the tracking points P1' to Pn'. The CPU determines, for example, intersections CP1 to CPm (m is a positive integer) of extension lines of combinations of optical flows OF1 to OFn adjacent to each other at an interval of M (M is a positive constant integer), calculates coordinates of the intersections and stores the information of those coordinates in the RAM. In FIG. 5, a part of the determined intersections are indicated by Δ.

Further, the CPU calculates matching rates Rc of the coordinates of the intersections, and determines an intersection with the highest matching rate Rc as a vanishing point Pv. In this case, it may be determined that the coordinates match when differences of the x coordinate and the y coordinate are within preset ranges. The matching rate Rc is a ratio of the number of intersections at which the coordinates match relative to the total number m of intersections, and average values of x and y coordinates of a plurality of intersections at which the matching rate Rc is highest may be determined to be x coordinate xv and y coordinate yv of the vanishing point Pv. The y-coordinate yv may be considered to be generated due to traveling motion such as rolling, pitching and bouncing of the vehicle, or generated due to a change in posture of the vehicle due to ups and downs of a road or the like.

Next, as shown in FIG. 2, based on the x-coordinate xv of the vanishing point Pv, the CPU calculates, a horizontal distance Lh between the intersection Oi and the vanishing point Pv in the imaging sensor 74 of the CCD camera 18. Further, the CPU calculates a slip angle β of the vehicle 16 according to the following equation (1), where Ls is a distance between the center of the lens 72 and the imaging sensor 74. The distance Ls may be stored in the ROM as a known value.

$$\beta = \arctan(Lh/Ls) \quad (1)$$

The above process is for the case where a vanishing point Pv can be properly determined. However, when determined number n of tracking points is small and when the maximum value Rcmax of the matching rate Rc of coordinates of the intersections is small, a vanishing point Pv cannot be properly determined. If a vanishing point Pv cannot be properly determined, the CPU does not calculate a slip angle β of the vehicle 16 based on a vanishing point as described above, but calculates a slip angle β of the vehicle based on motion state quantities such as a lateral acceleration Gy of the vehicle.

Figure 7:
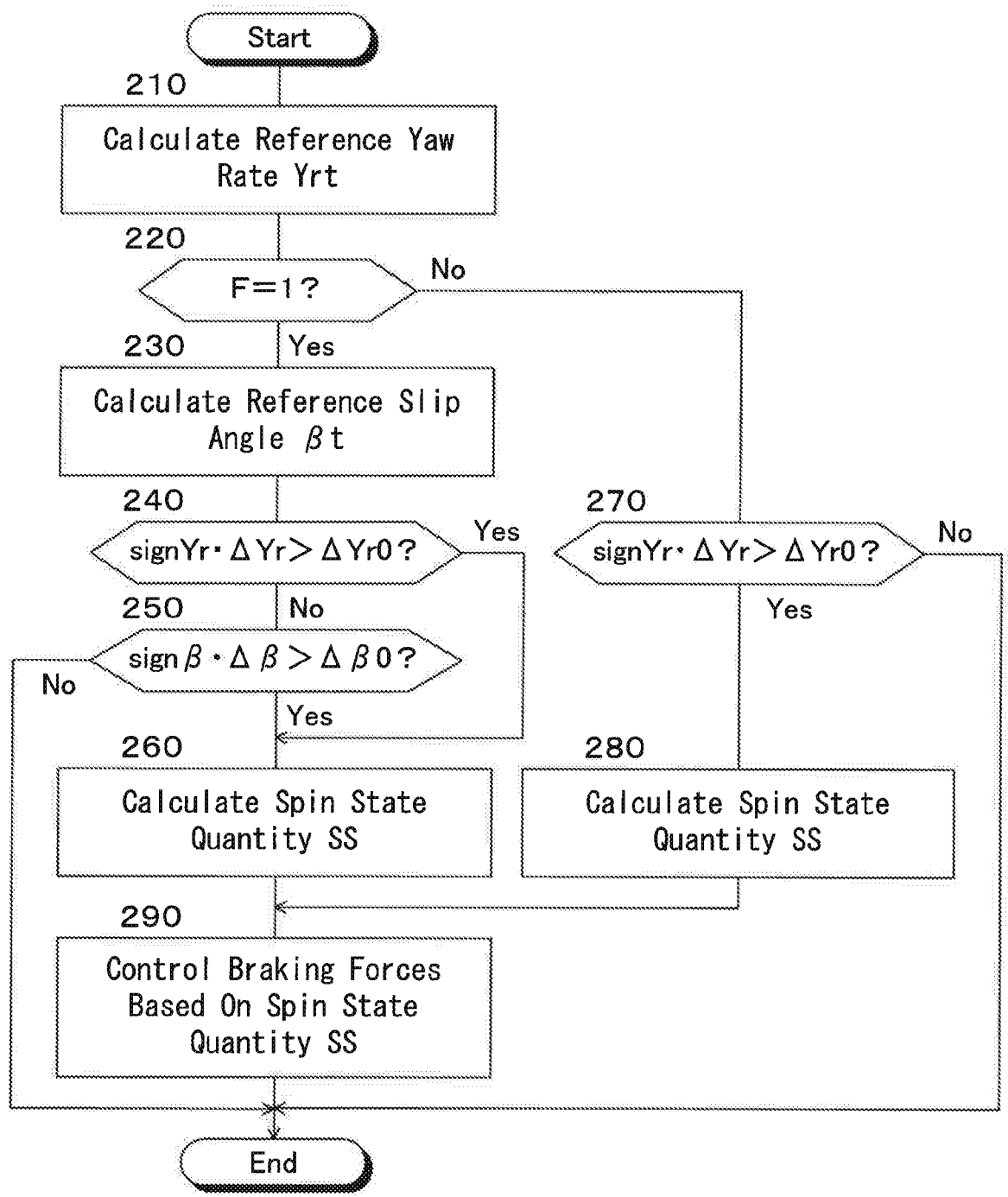
FIG. 7 is a flowchart showing a spin control routine in the first embodiment.

Further, the traveling control part of the electronic control unit 20 performs spin control as behavior control of the vehicle based on the slip angle β of the vehicle 16 according to the flowchart shown in FIG. 7. That is, as will be described in detail later, when the vehicle is in a spin state, the traveling control part applies a braking force to at least a turning outer front wheel to decelerate the vehicle and apply a spin suppression yaw moment to the vehicle, thereby performs spin control to reduce a degree of spin of the vehicle. Notably, the spin control of the vehicle does not form a part of the present disclosure, and may be performed according to any method known in the art, for example, as described in Japanese Patent Application Laid-open. No. 2006-282168.

<Calculation Control Routine of Slip Angle β>

Figure 6:
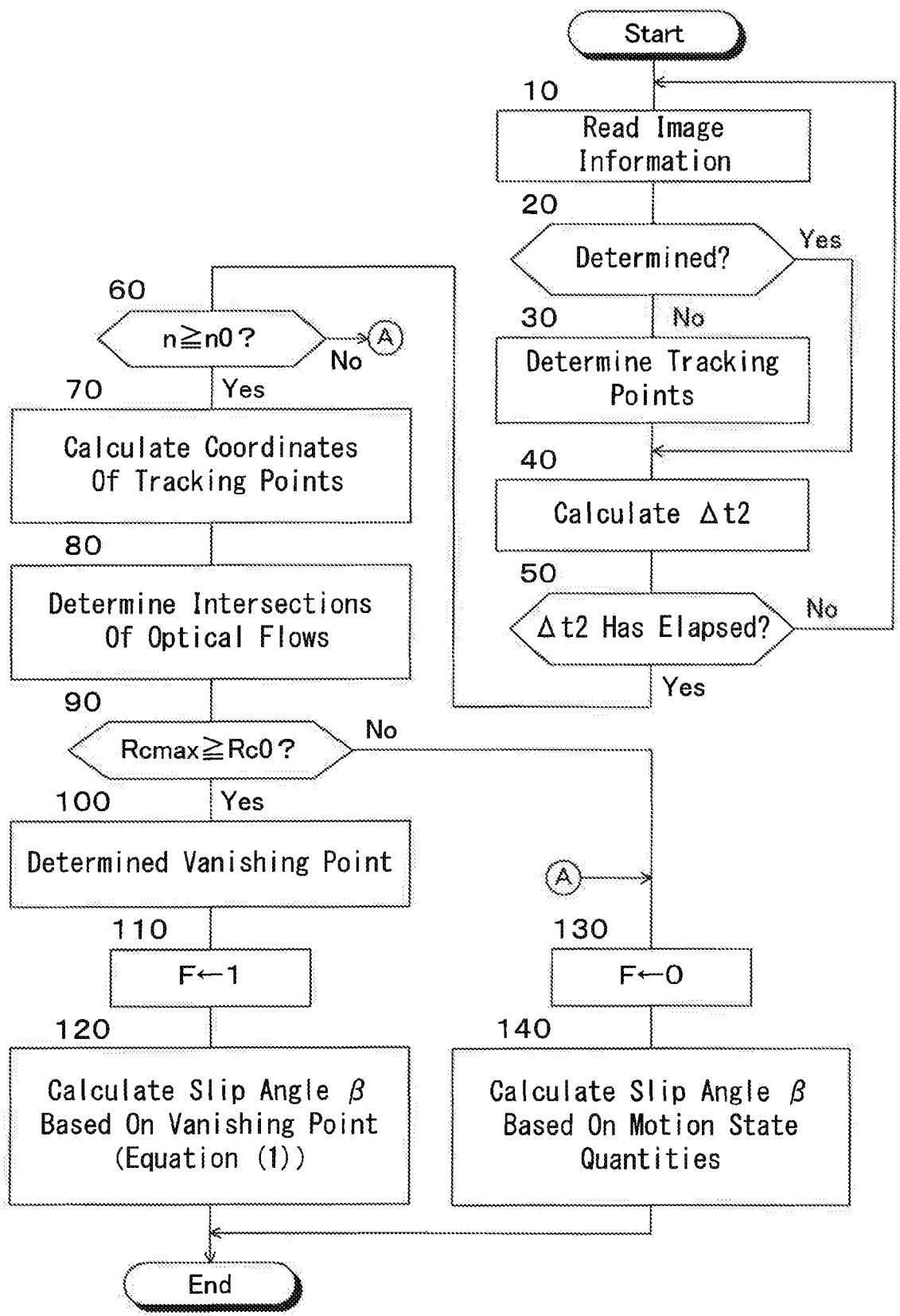
FIG. 6 is a flow chart showing a calculation control routine of a slip angle β in the first embodiment.

Next, a calculation control routine of a slip angle β in the first embodiment will be described with reference to the flowchart shown in FIG. 6. The calculation control of a slip angle β according to the flowchart shown in FIG. 6 is repeatedly executed at predetermined time intervals when an ignition switch not shown in FIG. 1 is on and a vehicle speed V is equal to or higher than a reference value V0 (a positive constant). In the following description, the calculation control of a slip angle β according to the flowchart shown in FIG. 6 is simply referred to as "the calculation control".

First, in step 10, image information on the front of the vehicle is read. Note that, at the start of calculation control, a flag F described later is reset to 0.

In step 20, a determination is made as to whether or not tracking points P1 to Pn have been determined. When an affirmative determination is made, although not shown in FIG. 6, after a tracking point tracking process is performed as necessary, the calculation control proceeds to step 40, and when a negative determination is made, the calculation control proceeds to step 30.

In step 30, tracking points P1 to Pn are determined as described above, and the information on their coordinates is stored in the RAM.

In step 40, a predetermined elapsed time Δt2 is calculated based on a vehicle speed V such that the larger the vehicle speed V, the smaller the elapsed time Δt2.

In step 50, a determination is made as to whether or not the predetermined elapsed time Δt2 or more has elapsed from when the tracking points are determined in step 30. When a negative determination is made, the calculation control returns to step 10, and when an affirmative determination is made, the calculation control proceeds to step 60.

In step 60, a determination is made as to whether or not the number n of the tracking points determined in step 30 is greater than or equal to a reference number n0 (a positive constant integer smaller than nmax). When a negative determination is made, the calculation control proceeds to step 130, and when an affirmative determination is made, the calculation control proceeds to step 70.

In step 70, coordinates of the tracking points P1 to Pn and their corresponding tracking points P1' to Pn' are calculated as described above, and the information of those coordinates is stored in the RAM.

In step 80, optical flows OF1 to OFn are determined based on the coordinates of the tracking points P1 to Pn and P1' to Pn' as described above. Further, intersections CP1 to OFn of extension lines of combinations of the optical flows OF1 to OFn are determined as described above, coordinates of the intersections are calculated, and information of these coordinates is stored in the RAM.

In step 90, matching rates Rc of the coordinates of the intersections CP1 to CPm are calculated as described above, and the maximum value Rcmax of the matching rates Rc is determined. Further, a determination is made as to whether or not the maximum value Rcmax is equal to or higher than a reference coincidence rate Rc0 (a positive constant smaller than 1). When a negative determination is made, the calculation control proceeds to step 130. When an affirmative determination is made, in step 100, the intersection with the highest matching rate Rc is determined as a vanishing point Pv.

In step 110, the flag F is set to 1. The fact that the flag F is 1 indicates that a slip angle β has been calculated based on the vanishing point, and the fact that the flag F is 0 indicates that a slip angle β has been calculated based on motion state quantities of the vehicle.

In step 120, a slip angle β of the vehicle 16 based on the vanishing point is calculated by executing the calculation according to the equation (1).

In step 130, the flag F is reset to 0, and in step 140, a slip angle β of the vehicle is calculated based on a lateral acceleration Gy and a yaw rate Yr of the vehicle as motion state quantities of the vehicle 16. For example, a deviation of a lateral acceleration, that is, a side slip acceleration Vyd of the vehicle is calculated as a deviation Gy−V·Yr between a lateral acceleration Gy and a product V·Yr of a vehicle speed V and a yaw rate Yr. Further, a side slip velocity Vy of the vehicle body is calculated by integrating the side slip acceleration Vyd, and a slip angle β of the vehicle is calculated as a ratio Vy/Vx of the side slip velocity Vy of the vehicle body to a longitudinal velocity Vx of the vehicle body (=a vehicle speed V).

When step 120 or 140 is completed, the information such as the tracking points P1 to Pn stored in the RAM is erased, and then the calculation control returns to step 10.

As understood from the above description, the travel control part of the electronic control unit 20, in particular, step 140 cooperates with the lateral acceleration sensor 68 and the yaw rate sensor 70 to function as a slip angle calculation device 100 for calculating a slip angle of the vehicle based on the motion state quantities of the vehicle.

<Spin Control Routine>

Next, spin control routine in the first embodiment will be described with reference to the flowchart shown in FIG. 7. Spin control according to the flowchart shown in FIG. 7 is repeatedly performed at predetermined intervals when the ignition switch not shown in FIG. 1 is on and a vehicle speed V is equal to or higher than the reference value V0. This spin control is similarly performed in the second embodiment described later.

First, in step 210 a reference yaw rate Yrt of the vehicle 16 is calculated based on a lateral acceleration Gy of the vehicle and a vehicle speed V as the motion state quantities of the vehicle 16 according to the following equation (2). In the following equation (2), δ is an actual steering angle of the left and right front wheels obtained by dividing a steering angle St by an overall gear ratio N of the steering device 12. Kh is a stability factor of the vehicle 16 and L is a wheelbase of the vehicle 16.

$$Yrt = \frac{V \cdot \delta}{L} - Gy \cdot Kh \cdot V \qquad (2)$$

In step 220, a determination is made as to whether or not the flag F is 1, that is, it is determined whether or not a slip angle β has been calculated based on a vanishing point. When a negative determination is made, the spin control proceeds to step 270, and when an affirmative determination is made, the spin control proceeds to step 230.

In step 230, based on the reference yaw rate Yrt of the vehicle calculated in step 210 and the vehicle speed V, a reference slip angle βt of the vehicle 16 is calculated according to the following equation (3). In the following equation (3), Lr is a distance between a center of gravity of the vehicle 16 and a rear wheel axle, mr is a rear wheel support load, and Kr is a rear wheel cornering power.

$$\beta t = \left(-\frac{2m_r}{K_r} + \frac{L_r}{V^2}\right)\left(\frac{\delta}{L} - Gy \cdot Kh\right)V^2 \qquad (3)$$

The reference slip angle βt of the vehicle may be calculated in any manner known in the art. For example, the reference slip angle β t of the vehicle may be calculated based on a yaw rate Yr and a vehicle speed V of the vehicle as the motion state quantities of the vehicle according to the following equation (4).

$$\beta t = \left(-\frac{2m_r}{K_r} + \frac{L_r}{V^2}\right)\left(\frac{\delta}{L} - Yr \cdot V \cdot Kh\right)V^2 \qquad (4)$$

In step 240, based on a yaw rate deviation ΔYr, which is a deviation Yr−Yt between the yaw rate Yr of the vehicle and the reference yaw rate Yrt, a determination is made as to whether or not a condition for permitting braking force control by the spin control holds. Specifically, it is determined whether or not a product of a sign sign Yr of the yaw rate Yr and the yaw rate deviation ΔYr exceeds a reference value ΔYr0 (a positive constant). When an affirmative determination is made, the spin control proceeds to step 260, and when a negative determination is made, the s pin control proceeds to step 250.

In step 250, a determination is made as to whether or not the spin control permission condition is established based on a slip angle deviation Δβ, which is a deviation β-βt between the slip angle β of the vehicle calculated in step 120 and the reference slip angle βt calculated in step 230. Specifically, it is determined whether or not a product of a sign sign β of the slip angle β and the yaw rate deviation Δβ exceeds a reference value Δβ (a positive constant). When an affirmative determination is made, the spin control proceeds to step 260, and when a negative determination is made, the spin control is temporarily ended.

In step 260, a spin value SV is calculated as a linear sum of the slip angle β of the vehicle calculated in step 120 and its derivative value βd, and a turning direction of the vehicle is determined based on a sign of the yaw rate Yr. Further, a spin state quantity SS is calculated as SV when the vehicle turns left, and as −SV when the vehicle turns right, and the spin state quantity is set to 0 when the spin value is negative.

In step 270, as in step 240, a determination is made based on the yaw rate deviation ΔYr as to whether or not a condition for permitting the control of the braking force by the spin control holds. Specifically, it is determined whether or not a product of a sign sign Yr of the yaw rate Yr and the yaw rate deviation ΔYr exceeds the reference value ΔYr0. When a negative determination is made, the spin control is once ended, and when an affirmative determination is made, the spin control proceeds to step 280.

In step 280, a spin value SV is calculated as a linear sum of the slip angle β of the vehicle calculated in step 140 and its derivative value βd, and a turning direction of the vehicle is determined based on a sign of the yaw rate Yr. Further, a spin state quantity SS is calculated as SV when the vehicle turns left, and as −SV when the vehicle turns right, and the spin state quantity is set to 0 when the spin value is negative.

In step 290, braking force control is performed by the spin control to reduce a degree of spin of the vehicle by applying an anti-spin yaw moment to the vehicle and decelerating the vehicle. For example, a target braking slip ratio Sfoutt of a turning outer front wheel is calculated so as to increase as the spin state quantity SS increases, and a braking force of the turning outer front wheel is controlled such that a braking slip ratio of the turning outer front wheel becomes the target braking slip ratio Sfoutt. When the spin state quantity SS is less than a control start reference value SSs (a positive constant), the target braking slip ratio Sfoutt is calculated to be 0, and no braking force is applied to the turning outer front wheel.

As understood from the above description, the electronic control unit 20 cooperates with the braking device 14, the vehicle speed sensor 66, the lateral acceleration sensor 68, the yaw rate sensor 70, etc. to function as a spin control unit for the vehicle provided with the slip angle estimation device 10 for the vehicle. A determination as to whether or not control of the braking forces by the spin control is permitted is made in steps 240, 250 and 270 of the flowchart shown in FIG. 7.

Second Embodiment

In the second embodiment, as shown in parenthesis in FIG. 2, the CCD camera 18 captures an image of the rear of the vehicle 16 along the optical axis 78 for every predetermined imaging time $\Delta t1$ thereby acquiring a back still image. As in the first embodiment, the optical axis 78 is aligned in the longitudinal direction of the vehicle as viewed from above the vehicle 16. A control program for calculating a slip angle $\beta$ of the vehicle based on the information of the image behind the vehicle 16 captured by the CCD camera 18 is stored in the ROM of the traveling control part of the electronic control unit 20. This control program corresponds to the flowchart shown in FIG. 8 described later.

Figure 9:
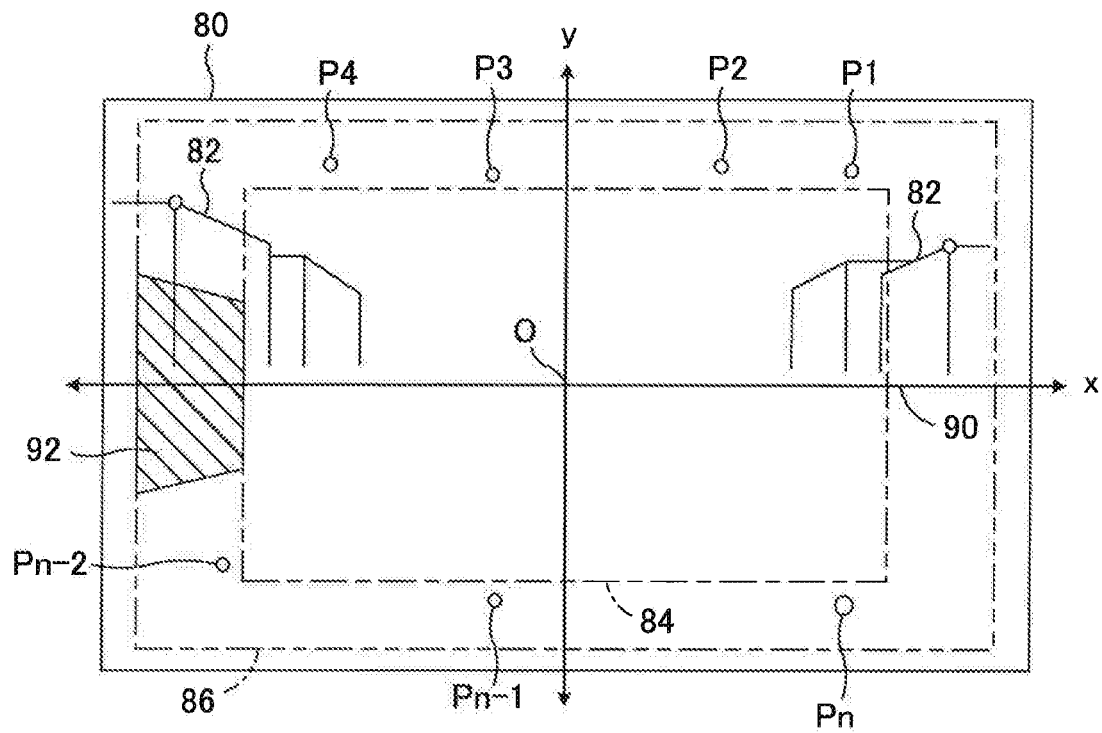
FIG. 9 is a diagram showing a procedure of determining tracking points. P1 to Pn for a plurality of objects in a captured image and calculating coordinates of the tracking points in the second embodiment.

In the second embodiment, the second reference frame 86 for determining a plurality of tracking points for a plurality of objects 82 in the captured image 80 is set close to the outline of the image 80, and the first reference frame 84 is surrounded by the second reference frame 86. As in the first embodiment, the CPU of the traveling control part determines n characteristic points for the plurality of objects 82 in the tracking point determination area 88 between the first reference frame 84 and the second reference frame 86 and determine them as tracking points P1 to Pn. In FIG. 9, examples of the determined tracking points are shown by white small circles. Further, the CPU calculates the coordinates of the tracking points, and stores the information of those coordinates in the RAM.

In countries and areas where vehicles are passing on the left, there is a high possibility that vehicles traveling in the opposite lane toward the vehicle will be photographed in the lower area of the second quadrant and the upper area of the third quadrant. The image information of these vehicle is extra information for determining a vanishing point. Therefore, for example, as indicated by hatching in FIG. 9, a tracking point determination exclusion area 92 in which any tracking point is not determined may be set. In addition, in countries and areas here vehicles are passing on the right, the tracking point determination exclusion area 92 is set to the lower area of the first quadrant and the upper area of the fourth quadrant.

Figure 10:
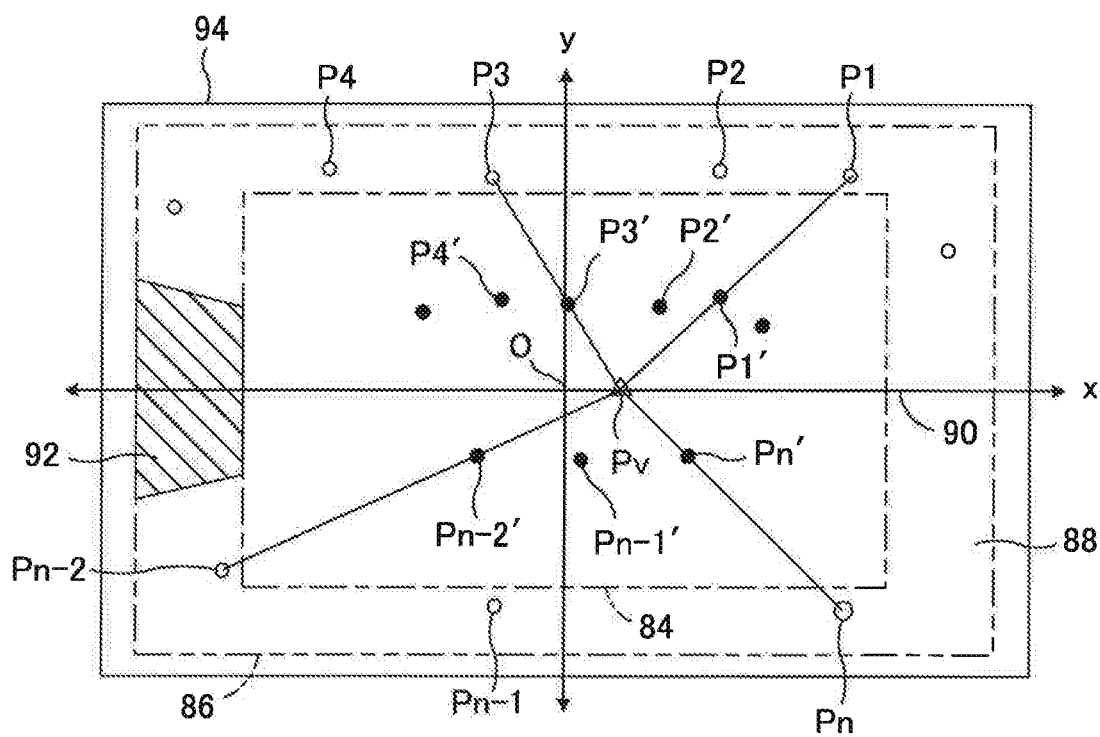
FIG. 10 is a view showing a procedure of specifying tracking points P1' to Pn' after movement and calculating their coordinates in an image captured after a predetermined elapsed time in the second embodiment.

Next, as shown in FIG. 10, the CPU specifies tracking points P1' to Pn' after moving corresponding to the tracking points P1 to Pn, respectively with respect to an image 94 captured after a predetermined elapsed time $\Delta t2$ from the capturing of the image 80, calculates their coordinates, and stores the same coordinate information in the RAM. In FIG. 10, the specified tracking points after moving are indicated by black small circles.

Next, the CPU determines optical flows OF1 to OFn and intersections CP1 to CPm of their extension lines in the same manner as in the first embodiment, calculates coordinates of the intersections, and stores the information of those coordinates in the RAM. In FIG. 10, parts of the determined intersections are indicated by $\Delta$.

Further, the CPU calculates matching rates Rc of the coordinates of the intersections in the same manner as in the first embodiment, determines the intersections with the highest coincidence rate Rc as a vanishing point Pv, and calculates a horizontal distance Lh between the intersection Oi and the vanishing point Pv in the imaging sensor 74. Further, the CPU calculates a slip angle $\beta$ of the vehicle 16 according to the above equation (1).

Figure 8:
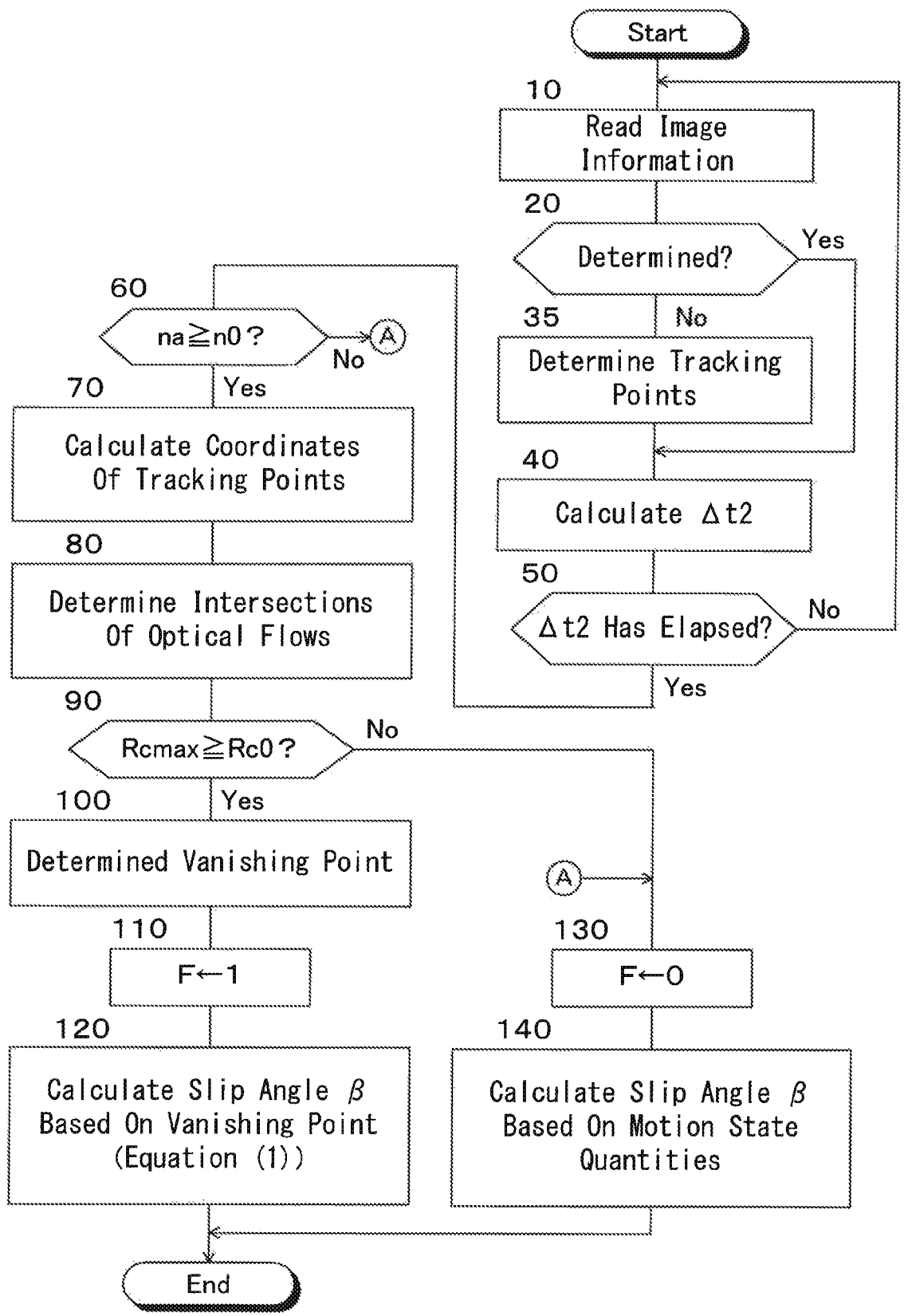
FIG. 8 is a flow chart showing a calculation control routine of a slip angle β in the second, embodiment.

As shown in FIG. 8, the calculation control of a slip angle $\beta$ in the second embodiment is performed in the same manner as the calculation control of the first embodiment performed according to the flowchart shown in FIG. 6 except that step 35 is performed instead of step 30.

In step 35, tracking points P1 to Pn and tracking points P1' to Pn after moving are determined for images 80 and 94 respectively as described above in a manner shown in FIGS. 9 and 10, and coordinates of the tracking points are calculated.

Operation of Embodiments

As understood from the above description, according to the first and second embodiments, in step 10, image information captured by the CCD camera 18 is read, and in step 30, the tracking points P1 to Pn are determined. In step 70, coordinates of the tracking points P1 to Pn and the tracking points P1' to Pn' after moving corresponding to the former tracking points are calculated for a plurality of objects 82 in the image. In step 80, optical flows OF1 to OFn are determined based on the coordinates of the tracking points and the coordinates of the tracking points after moving, and in step 100, a vanishing point Pv is determined by determining intersections CP1 to CPm of extension lines of the optical flows. Further, in step 120, a slip angle $\beta$ of the vehicle 16 is calculated according to the above equation (1) based on a ratio of a horizontal distance Lh between the center of the image and the vanishing point to the distance Ls between the center Pc of the lens 72 and the imaging sensor 74.

As described above, the optical axis 78 of the CCD camera 18 is aligned in the longitudinal direction of the vehicle 16. As shown in FIG. 2, a straight line connecting the vanishing point Pv and the center Pc of the lens 72, and hence a straight line 96 connecting the vanishing point Pv and an actual vanishing point Pv', indicates a moving direction of the vehicle 16. Therefore, an angle $\alpha$ formed by the straight line 96 with respect to the optical axis 78 corresponds' to a slip angle $\beta$ which is an angle formed by the longitudinal direction of the vehicle 16 with the moving direction of the vehicle or the opposite direction.

The x coordinate of the vanishing point Pv determined by the tracking points P1 to Pn and P1' to Pn' is not affected by the slope of the road in the lateral direction, and is determined by an angle formed by the longitudinal direction of the vehicle 16 with the moving direction of the vehicle. Therefore, according to the first and second embodiments, a slip angle $\beta$ of the vehicle 16 can be calculated accurately according to the above equation (1) without being affected by the lateral inclination of the road or the like.

According to the first and second embodiments, a first reference frame centered on a center of the image and, a second reference frame surrounding the first reference frame are stored, and a plurality of characteristic points of objects located in a tracking point determination area between the first reference frame and the second reference frame are determined as tracking points. Therefore, it is possible to efficiently determine tracking points as compared to where a plurality of characteristic points of objects in the entire range of the image are determined as tracking points without setting the tracking point determination area and to reduce a load on the control unit. Further, it is possible to effectively reduce the possibility that any characteristic point moving to a position where an optical flow cannot be properly determined after a predetermined elapsed time is determined as a tracking point.

In particular, when a tracking point determination exclusion area 92 in which no tracking point is determined as described above is set, it is possible to reduce the possibility that any tracking point is unnecessarily determined for vehicles traveling in the opposite lane. Therefore, as compared to where a tracking point determination exclusion area 92 is not set, it is possible to reduce the possibility that optical flows OF1 to OFn and a vanishing point Pv are improperly determined due to unnecessary determination of tracking points for vehicles traveling in the opposite lane and a slip angle β of the vehicle 16 is incorrectly estimated.

Further, according to the first and second embodiments, a plurality of intersections CP1 to CPm of the plurality of optical flow flows OF1 to OFn are determined, and among the plurality of intersections, the intersection having the highest matching rate Rc is determined as a vanishing point Pv. Therefore, even when the intersections of a plurality of optical flows are not determined at one point, a vanishing point can be determined with certainty, and the position of the vanishing point can be determined at an appropriate position.

Further, according to the first and second embodiments, when the number n of tracking points determined is less than the reference number n0 due to the inability to clearly image the objects 82 because of weather conditions or the like, calculation of a vehicle slip angle β based on a horizontal distance Lh is not performed, but a slip angle of the vehicle is calculated by the slip angle calculation device 100. Therefore, it is possible to prevent a vanishing point Pv from being determined to an incorrect position by calculating the slip angle of the vehicle based on a horizontal distance Lh due to the small number of tracking points, optical flows and intersections of optical flows.

Further, according to the first and second embodiments, when the highest matching rate Rcmax among the matching rates Rc of the intersections CP1 to CPm is less than the reference match rate Rc0, calculation of a slip angle of the vehicle based on a horizontal distance Lh is not performed, but a slip angle of the vehicle is calculated by the slip angle calculation device 100. Therefore, it can be avoided that a vanishing point Pv is determined to be an incorrect position by calculating a slip angle of the vehicle based on a horizontal distance Lh in spite that the highest matching rate Rcmax is a low value.

Further, according to the first and second embodiments, the predetermined elapsed time Δt2 is variably set according to a vehicle speed V so as to be shorter as a vehicle speed is higher. Therefore, it is possible to reduce the possibility that the above-described problems occur when the predetermined elapsed time is set to a short constant time or a long constant time, and a vanishing point Pv can be determined at an accurate position.

Further, according to the first and second embodiments, in a situation where a slip angle β of the vehicle is calculated based on a horizontal distance Lh, control of braking forces by the spin control is permitted when the permission condition based on a deviation Δβ between a slip angle β of the vehicle calculated based on the horizontal distance Lh and a reference slip angle β t or the permission condition based on a deviation ΔYr between a yaw rate Yr of the vehicle and a reference yaw rate Yrt is established. Therefore, even when the vehicle travels on a lateral inclination road, it is possible to appropriately determine whether or not the braking force control by the spin control is permitted by the permission determination based on a slip angle deviation Δβ without being affected by a lateral force caused by a lateral inclination of a road surface.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described embodiments, the first and second reference frames 84 and 86 are fixed, so that the tracking point determination area 88 is also fixed. However, the positions and sizes of the first and second reference frames 84 and 86, and hence the position and size of the tracking point determination area 88, may be variably set according to a vehicle speed V.

In the above-described embodiments, in step 140, a deviation Gy−V·Yr between a lateral acceleration Gy of the vehicle and a product of a vehicle speed V and a yaw rate Yr is integrated to calculate a side slip velocity Vy of the vehicle, and a slip angle β of the vehicle is calculated as a ratio of side slip velocity Vy to a longitudinal velocity Vx of the vehicle. However, in step 140, a slip angle of the vehicle may be calculated based on the motion state quantities of the vehicle by any procedure known in the art, and further may be calculated based on a detection result of a gyro sensor or the like.

Further, in the above-described embodiments, the optical axis 78 of the CCD camera 18 is aligned in the longitudinal direction of the vehicle 16 as viewed from above the vehicle. However, the optical axis 78 may be inclined relative to the longitudinal direction of the vehicle 16 when viewed from above the vehicle. In that case, the slip angle of the vehicle calculated according to equation (1) may be corrected by the inclination angle of the optical axis 78 relative to the longitudinal direction of the vehicle 16. The inclination angle of the optical axis 78 may be a slip angle of the vehicle which is calculated according to the equation (1) when the vehicle is traveling straight.

Further, in the above-described embodiments, image information is read at each cycle time of the flowchart shown in FIG. 6 or FIG. 8, but the reading of image information may be modified such that the image information 94 is read after a predetermined elapsed time Δt2 has elapsed since the image information 80 was read.

Further, in the above-described embodiments, the imaging device is a CCD camera 18, but may be any imaging device known in the art, such as a video camera, as long as it can capture still images.

What is claimed is:

1. A slip angle estimation device for a vehicle comprises:
 an imaging device for capturing a plurality of images an image of at least one of the front and the rear of the vehicle, the imaging device includes a lens and an imaging sensor; and a control unit configured to calculate a slip angle of the vehicle based on information of the plurality of images captured by the imaging device and based on a ratio of the horizontal distance at the imaging sensor to a distance between the lens and the imaging sensor, and the control unit is configured to determine a plurality of tracking points for a plurality of captured objects, determine a plurality of optical flows for the plurality of tracking points based on two images of the plurality of images captured at predetermined elapsed time intervals, determine a vanishing point based on intersections of the plurality of optical flows, and calculate a slip angle of the vehicle based on a horizontal distance between a center of the images and the vanishing point.

2. The slip angle estimation device for a vehicle according to claim 1, wherein the control unit is configured to store a first reference frame centered on the center of the plurality of images and a second reference frame surrounding the first reference frame, and determine a plurality of characteristic points of the objects located in a tracking point determination area between the first and second reference frames as tracking points.

3. The slip angle estimation device for a vehicle according to claim 1, wherein the control unit is configured to determine a plurality of intersections and determine a vanishing point based on intersections having the highest matching rate among the plurality of intersections.

4. The slip angle estimation device for a vehicle according to claim 3, wherein the control unit includes a slip angle calculation device configured to calculate a slip angle of the vehicle based on motion state quantities of the vehicle, and is configured not to calculate a slip angle of the vehicle based on the horizontal distance when the highest match rate is less than a reference match rate and to calculate a slip angle of the vehicle by the slip angle calculation device.

5. The slip angle estimation device for a vehicle according to claim 1, wherein the control unit includes a slip angle calculation device configured to calculate a slip angle of the vehicle based on motion state quantities of the vehicle, and is configured not to calculate a slip angle of the vehicle based on the horizontal distance when a number of determined tracking points is less than a reference number and to calculate a slip angle of the vehicle by the slip angle calculation device.

6. The slip angle estimation device for a vehicle according to claim 1, wherein the control unit is configured to variably set a predetermined elapsed time according to a vehicle speed so that the predetermined elapsed time becomes shorter as the vehicle speed increases.

7. A spin control device for a vehicle comprising:
a slip angle estimation device for a vehicle comprises:
an imaging device for capturing a plurality of images of at least one of the front and the rear of the vehicle; and
a control unit configured to calculate a slip angle of the vehicle based on information of the plurality of images captured by the imaging device, and the control unit is configured to determine a plurality of tracking points for a plurality of captured objects, determine a plurality of optical flows for the plurality of tracking points based on two images of the plurality of images captured at predetermined elapsed time intervals, determine a vanishing point based on intersections of the plurality of optical flows, and calculate a slip angle of the vehicle based on a horizontal distance between a center of the images and the vanishing point, wherein the control unit includes a slip angle calculation device configured to calculate a slip angle of the vehicle based on motion state quantities of the vehicle, and is configured not to calculate a slip angle of the vehicle based on the horizontal distance when a number of determined tracking points is less than a reference number and to calculate a slip angle of the vehicle by the slip angle calculation device, and in a situation where a slip angle of the vehicle is calculated by the slip angle calculation device, control of braking forces by spin control is permitted when a permission condition based on a deviation between a yaw rate of the vehicle and a reference yaw rate is satisfied, and in a situation where a slip angle of the vehicle is calculated based on the horizontal distance, control of braking forces by spin control is permitted when a permission condition based on a deviation between a yaw rate of the vehicle and a reference yaw rate or a permission condition based on a deviation between a slip angle of the vehicle calculated based on the horizontal distance and a reference slip angle is satisfied.

8. A spin control device for a vehicle comprising:
a slip angle estimation device for a vehicle comprises:
an imaging device for capturing a plurality of images of at least one of the front and the rear of the vehicle; and
a control unit configured to calculate a slip angle of the vehicle based on information of the plurality of images captured by the imaging device, and the control unit is configured to determine a plurality of tracking points for a plurality of captured objects, determine a plurality of optical flows for the plurality of tracking points based on two images of the plurality of images captured at predetermined elapsed time intervals, determine a vanishing point based on intersections of the plurality of optical flows, and calculate a slip angle of the vehicle based on a horizontal distance between a center of the images and the vanishing point, wherein the control unit is configured to determine a plurality of intersections and determine a vanishing point based on intersections having the highest matching rate among the plurality of intersections, wherein the control unit includes a slip angle calculation device configured to calculate a slip angle of the vehicle based on motion state quantities of the vehicle, and is configured not to calculate a slip angle of the vehicle based on the horizontal distance when the highest match rate is less than a reference match rate and to calculate a slip angle of the vehicle by the slip angle calculation device, and in a situation where a slip angle of the vehicle is calculated by the slip angle calculation device, control of braking forces by spin control is permitted when a permission condition based on a deviation between a yaw rate of the vehicle and a reference yaw rate is satisfied, and in a situation where a slip angle of the vehicle is calculated based on the horizontal distance, control of braking forces by spin control is permitted when a permission condition based on a deviation between a yaw rate of the vehicle and a reference yaw rate or a permission condition based on a deviation between a slip angle of the vehicle calculated based on the horizontal distance and a reference slip angle is satisfied.

* * * * *